United States Patent
Bristol et al.

(10) Patent No.: US 8,775,163 B1
(45) Date of Patent: Jul. 8, 2014

(54) SELECTABLE SILENT MODE FOR REAL-TIME AUDIO COMMUNICATION SYSTEM

(71) Applicant: Rallee, Bellevue, WA (US)

(72) Inventors: Tony Bristol, Bellevue, WA (US); Marvin Ingelman, Vaughan, CA (US)

(*) Notice: Subject to any disclaimer, the term of this patent is extended or adjusted under 35 U.S.C. 154(b) by 0 days.

(21) Appl. No.: 13/836,906

(22) Filed: Mar. 15, 2013

(51) Int. Cl.
*G06F 17/27* (2006.01)

(52) U.S. Cl.
USPC .......... 704/9; 704/257; 704/224; 379/202.01; 379/204.01; 379/388.02; 379/32.01

(58) Field of Classification Search
USPC .............. 704/202.01, 204.01, 388.02, 32.01, 704/93.05, 93.09, 93.37, 9, 257, 275, 270, 704/260, 235; 709/224, 204, 207, 219, 206; 719/329, 313; 370/261, 260; 455/466, 455/416; 379/202.01, 204.01, 388.02, 379/32.01, 93.05, 93.09, 93.37
See application file for complete search history.

(56) References Cited

U.S. PATENT DOCUMENTS

| | | | | |
|---|---|---|---|---|
| 6,782,364 | B2* | 8/2004 | Horvitz | 704/275 |
| 7,111,044 | B2* | 9/2006 | Lee | 709/204 |
| 7,640,293 | B2* | 12/2009 | Wilson et al. | 709/203 |
| 8,001,181 | B2* | 8/2011 | Wilson et al. | 709/203 |
| 8,140,980 | B2* | 3/2012 | Gunasekar et al. | 715/753 |
| 2004/0015547 | A1* | 1/2004 | Griffin et al. | 709/204 |
| 2007/0071206 | A1* | 3/2007 | Gainsboro et al. | 379/168 |
| 2007/0233802 | A1* | 10/2007 | Kulkarni | 709/207 |
| 2009/0125295 | A1* | 5/2009 | Drewes | 704/3 |
| 2011/0054894 | A1* | 3/2011 | Phillips et al. | 704/235 |
| 2011/0054897 | A1* | 3/2011 | Phillips et al. | 704/235 |
| 2011/0069643 | A1* | 3/2011 | Yoakum et al. | 370/261 |
| 2012/0022857 | A1* | 1/2012 | Baldwin et al. | 704/9 |
| 2012/0117153 | A1* | 5/2012 | Gunasekar et al. | 709/204 |
| 2013/0156167 | A1* | 6/2013 | Talwar et al. | 379/88.12 |
| 2013/0157626 | A1* | 6/2013 | Talwar et al. | 455/413 |

* cited by examiner

*Primary Examiner* — Vijay B Chawan
(74) *Attorney, Agent, or Firm* — Steve Witters; Witters & Associates

(57) ABSTRACT

A facility for conducting a real-time conversation in which the selected one of a number of participants utilizes a silent mode is described. Remark spoken by participants other than the selected one are transformed into text and displayed for the selected participant. Remarks entered textually by the selected participant are transformed into speech and played audibly for participants other than the selected one.

15 Claims, 9 Drawing Sheets

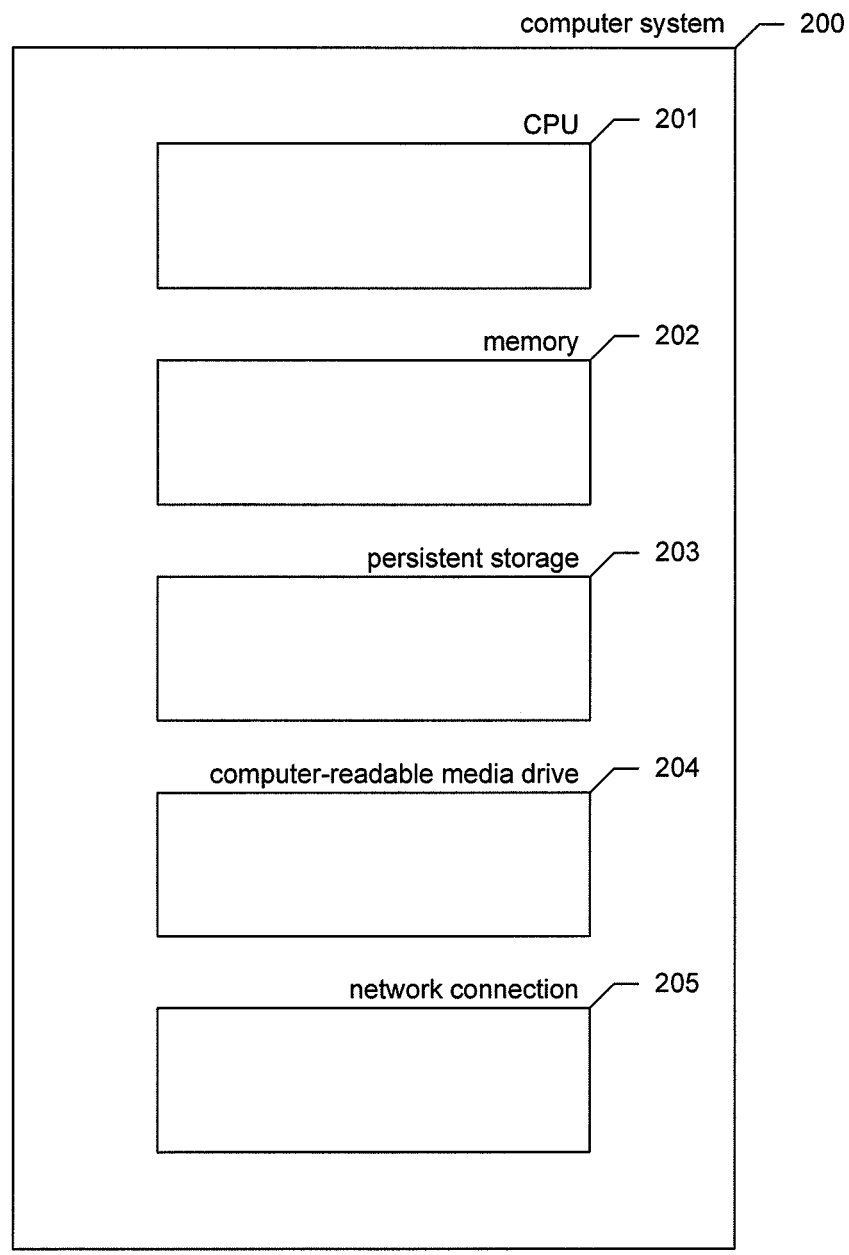
FIG. 2 *Prior Art*

| call id | participant id | slient mode |
|---------|----------------|-------------|
| 7633 | 67 | no |
| 7633 | 32 | no |
| 7633 | 44 | yes |
| 8451 | 11 | no |
| 8451 | 96 | no | call table ~400

| participant table | | |
|---|---|---|
| participant id | address | language |
| 11 | 144.12.8.15:210 | English — 501 |
| 32 | 94.3.212.6:210 | English — 502 |
| 44 | 55.9.64.78:210 | German — 503 |
| 67 | 230.44.97.199:210 | French — 504 |
| 96 | 54.23.56.1:210 | French — 505 |

SELECTABLE SILENT MODE FOR REAL-TIME AUDIO COMMUNICATION SYSTEM

TECHNICAL FIELD

The described technology is directed to the field of electronic communications.

BACKGROUND

A variety of approaches exist to conducting two-wavy voice communication between people who are in different places, including, for example, public-switched telephone network calls (in some cases involving cellular or other wireless communications on behalf of at least some of the participants), voice over IP calls, push-to-talk connections among predetermined participants provided by wireless carriers, etc. All of these modalities are capable of facilitating real-time voice communication between two or more participants, during which all the participants can hear any speech uttered by any of the participants.

BRIEF DESCRIPTION OF THE DRAWINGS

FIG. 2 is a block diagram showing some of the components typically incorporated in at least some of the clients, servers, and other devices on which the facility operates.

FIG. 4 is a table diagram showing sample contents of a call table used by the facility in some embodiments to store information about active calls.

FIG. 5 is a table diagram showing sample contents of a participant table used by the facility in some embodiments to store information about each user using the facility.

DETAILED DESCRIPTION

Figure 1:
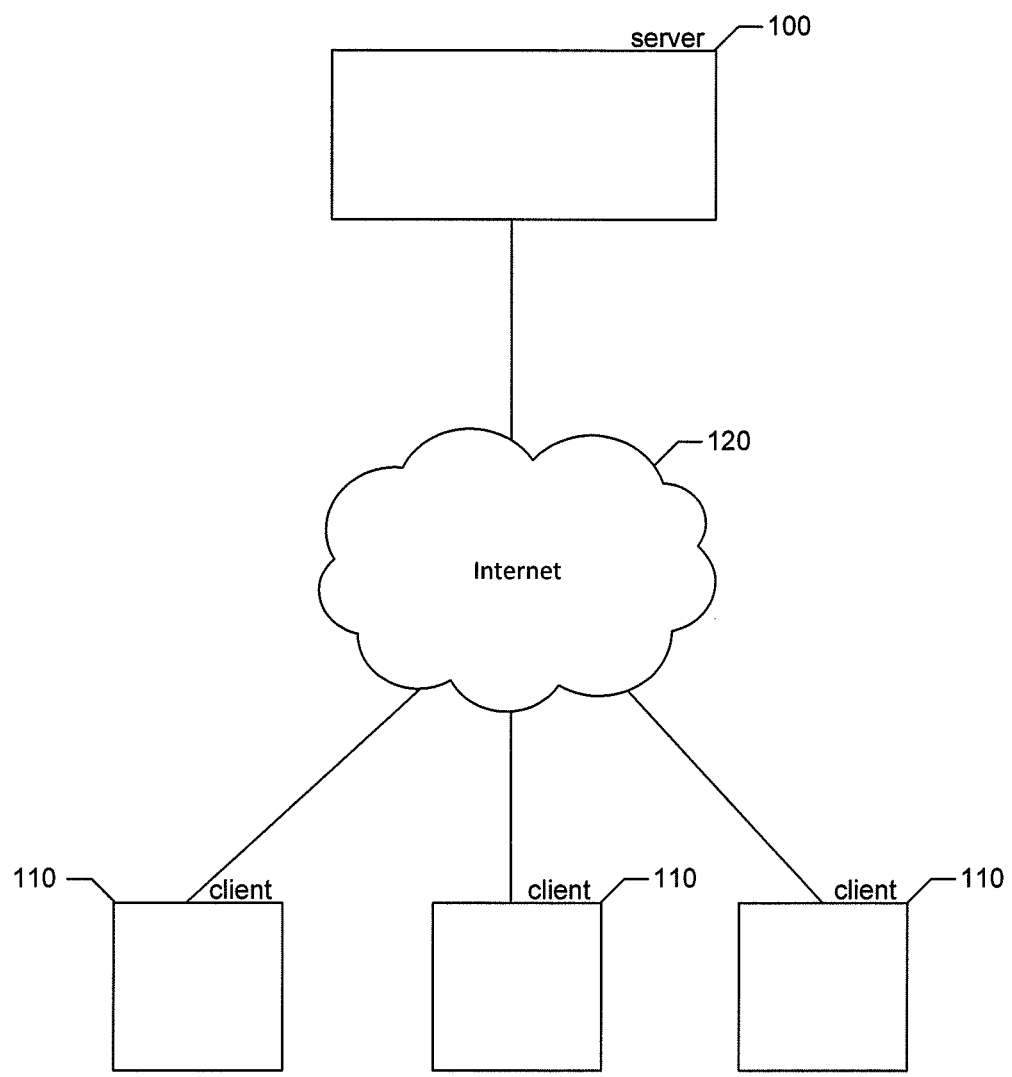
FIG. 1 is a high-level data flow diagram showing data flow within a typical arrangement of components used to provide the facility.

The inventors have recognized that audio conversations are ill-suited to certain environments or contexts, including those in which silence is expected (a business meeting, a classroom, a library, a bedroom where someone is trying to sleep), as well as those that are so loud as to prevent effective voice communication (a factory, a construction site, a sporting event, a musical concert). The inventors have further recognized that a common response by a participant in a voice conversation to entering a context that is poorly-suited to voice communication is, accordingly, to terminate their participation in the conversation, ending the conversation in the case of a two-person conversation, or dropping from the conversation where two or more participants remain. Finally, the inventors have recognized that the tendency of participants to exit voice conversations when they enter a context ill-suited to voice conversations tends to limit the overall value of voice conversations as a communications modality, and correspondingly limit the value of tools for supporting conversations that are conducted exclusively via voice.

In response to such recognition, the inventors have developed a software and/or hardware facility for adapting a voice conversation to a context in which it is difficult or impossible for a participant in the conversation to participate by voice. In particular, the facility provides, with respect to a real time audio communication system, such as a push-to-talk audio communication system implementing using voice over IP, a "silent mode" that is selectable by at least one of the participants to shift the nature of the participant's participation from participation by voice (that is, hearing the utterances of other participants and having other participants hear his or her utterances) to participating by text (that is, by reading textual transcriptions of the other participant's utterances generated by a speech recognition system, and/or by having his or her typed or swiped or handwritten remarks rendered into audio speech by a text-to-speech system to be heard by the other participants).

In some embodiments, the facility includes a natural language translation capability so that a user's textual participation can be in a language that differs from the language spoken and heard by the participants who are participating in audio mode. For example, the audio conversation may be conducted entirely in English; when a Spanish-reading and -writing participant engages the silent mode, the audio utterances of the other participants are first transcribed by the facility to English text, then translated by the facility from English to Spanish for display to the silent mode user. The silent mode user enters his or her textual remarks in Spanish text, which the facility first translates to English text, then renders as English speech.

In some embodiments, the facility performs as a real-time natural language translation agent within an audio conversation. For example, an audio conversation may be conducted by two participants in French and a third participant in Portuguese. When one of the French participants makes an utterance, it is delivered unaltered to the other French participant. For the Portuguese participant, the facility first transcribes the French utterance into French text, then translates the French text into Portuguese text, then renders the Portuguese text as Portuguese speech to be heard by the Portuguese participant. When the Portuguese participant makes an utterance, the facility transcribes it into Portuguese text, translating the Portuguese text into French text, and renders the French text as French speech to be heard by the two French participants.

In various embodiments, the facility permits the participants in a conversation to use a variety of devices to participate in a conversation, including mobile phones, tablets, laptop and desktop computers, automobile computers, tabletop computers, etc.

By behaving in some or all of these ways, the facility makes voice conversations more accessible and useful to participants in a wider variety of situations.

FIG. 1 is a high-level data flow diagram showing data flow within a typical arrangement of components used to provide the facility. A number of clients 110 run a call client program and are used by users to participate in real-time discussions. The clients are connected to a network 120 such as the Internet, as are one or more servers 100. To participate in a call, a user's client communicates with the server, which exchanges data between the clients of the users participating in the call.

While various embodiments are described in terms of the environment described above, those skilled in the art will appreciate that the facility may be implemented in a variety of other environments including a single, monolithic computer system, as well as various other combinations of computer systems or similar devices connected in various ways including cloud computing resources. In various embodiments, a variety of computing systems or other different client devices may be used in place of the web client computer systems, such as mobile phones, personal digital assistants, televisions and associated video sources, cameras, tablet computer systems, laptop computer systems, desktop computer systems, etc.

FIG. 2 is a block diagram showing some of the components typically incorporated in at least some of the clients, servers, and other devices on which the facility operates. In various embodiments, these devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3A:
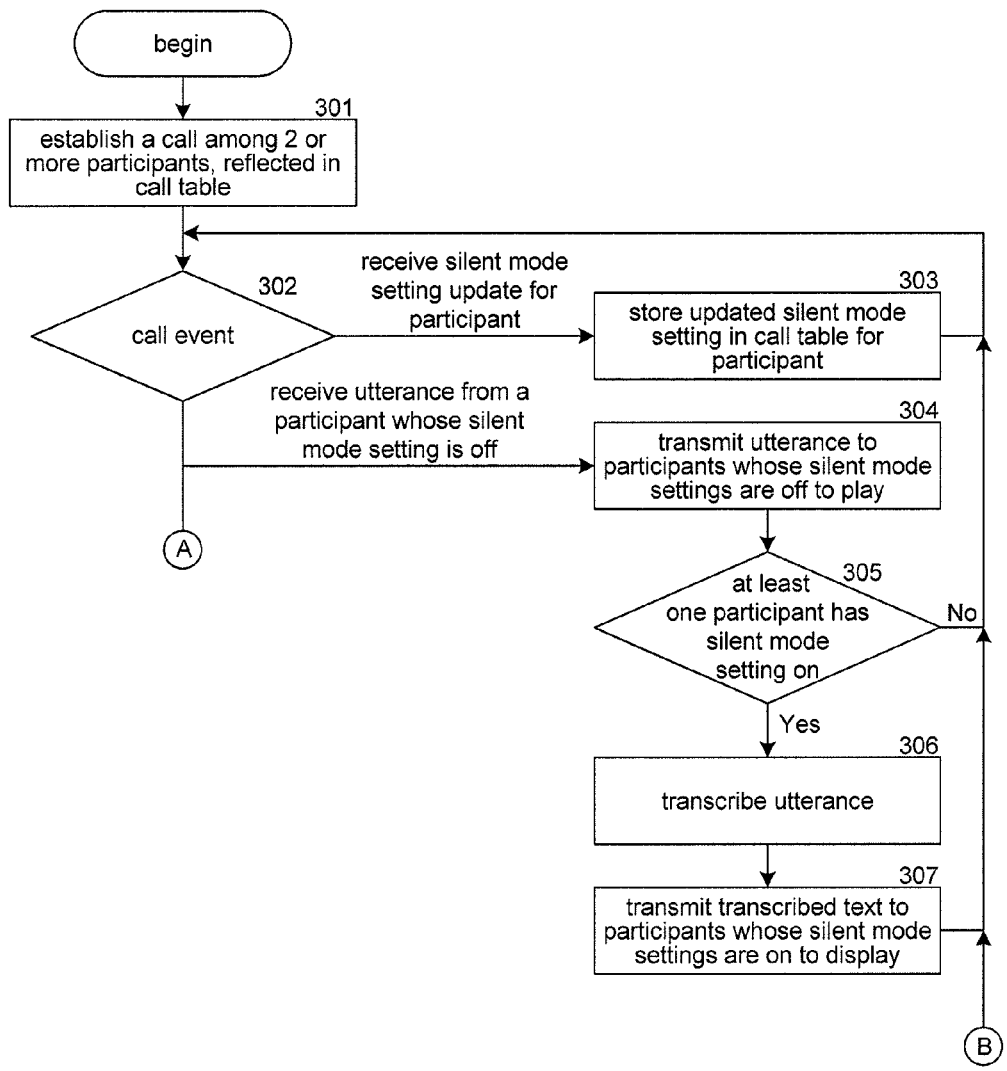
FIGS. 3A-3B are flow diagrams showing steps performed by the facility on the server in some embodiments to conduct a call.
Figure 3B:
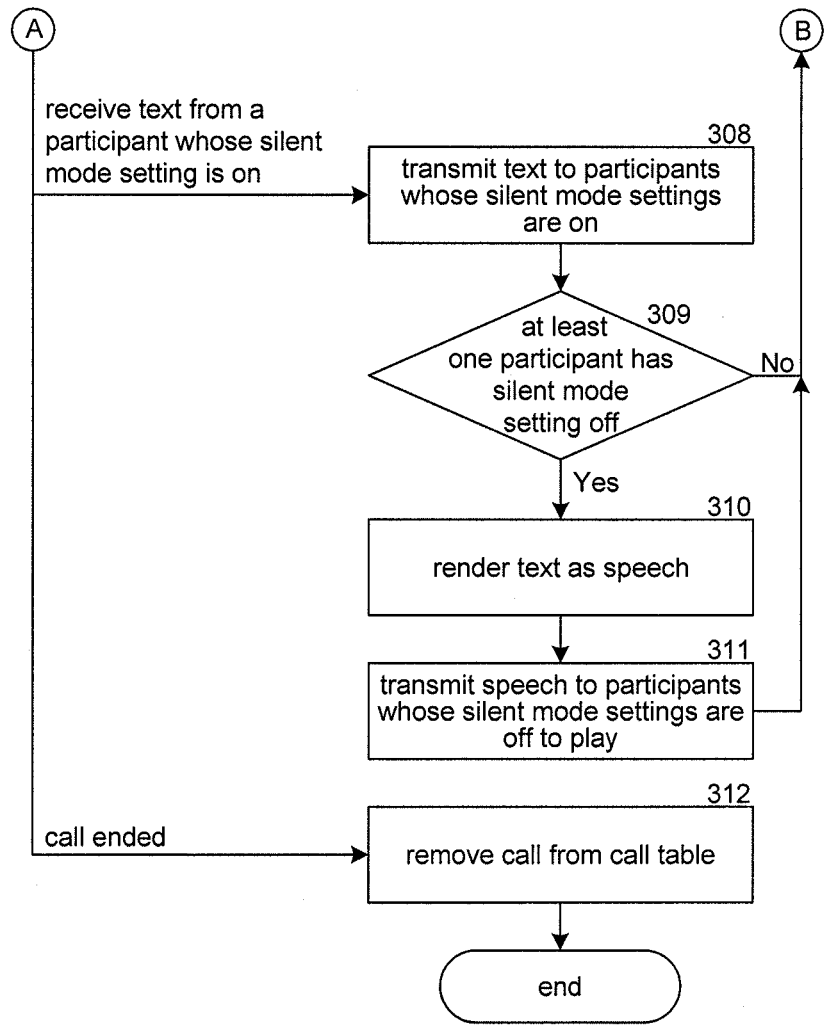

FIGS. 3A-3B are flow diagrams showing steps performed by the facility on the server in some embodiments to conduct a call. In step 301, the facility establishes a call among two or more participating users ("participants"). In establishing the call, the facility establishes an initial silent mode setting for each of the participants. In various embodiments the facility does this by, for example, choosing the silent mode setting off for all participants; for each participant, choosing a silent mode setting that has been established by the participant as his or her default; etc. As part of establishing the call in steps 301, the facility augments a call table to contain information about the call.

FIG. 4 is a table diagram showing sample contents of a call table used by the facility in some embodiments to store information about active calls. The call table 400 is made up of rows, such as rows 401-405, each representing a different participant in an active call. Each row is divided into the following columns: a call identifier column 411 that contains an identifier identifying the call in which the participant is participating; a participant id column 412 that contains a participant id uniquely identifying the participant; and a silent mode column 413 that indicates whether the silent mode is set for the participant. For example, row 403 indicates that the participant having participant id 44 is participating in call 7633 and is presently using the silent mode. It can be seen that there are two active calls represented in the call table: a first call represented by rows 401-403, and a second call represented by rows 404-405. In the first call, participants 32 and 67 are not presently using silent mode, while participant 44 is using silent mode.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

FIG. 5 is a table diagram showing sample contents of a participant table used by the facility in some embodiments to store information about each user using the facility. The participant table 500 is made up of rows, such as rows 501-505 each corresponding to a different user. Each row is divided into the following columns: a participant id column 511 containing a unique identifier identifying the participant; an address column 512 containing an address usable to contact the client device being used by the participant; and a language column 513 indicating the language in which the participant uses the facility. For example, row 503 indicates that the participant having participant id 44 can be reached at the address 55.9.64.78:210 and uses the facility in German.

Returning to FIG. 3A, in step 302, the facility switches on the type of a call event, that is, an event that occurs in the call established in step 301. Where the call event is to receive a silent mode setting update for one of the participants in the call, the facility continues from step 302 in step 303. In step 303, the facility stores the received updated silent mode setting in the call table for the participant. For example, where the received silent mode setting update is from participant 44 to turn off silent mode, the facility would replace the yes at the intersection of row 403 and column 413 of call table 400 with no. After step 303, the facility continues in step 302 to process the next call event.

Where the call event is to receive an utterance from the client being used by the participant whose silent mode setting is off, the facility continues from step 302 in step 304. In step 304, the facility transmits the received utterance to any participants in the call whose silent mode settings are off, so that these clients can play the utterance on their speakers. In step 305, if at least one participant in the call has the silent mode setting on, then the facility continues in step 306, else the facility continues in step 302. In step 306, the facility uses speech recognition techniques to transcribe the utterance; that is, produce text containing the words spoken in the utterance. In various embodiments, the facility uses a wide variety of speech recognition techniques for performing such transcription, including those that use either speaker-dependent or speaker-independent voice models, and also including the techniques described in the Wikipedia article for Speech Recognition, available at http://en.wikipedia.org/wiki/Speech_recognition, which is hereby Incorporated by reference in its entirety. In some embodiments, the facility uses the language indication stored in column 513 of participant table 500 for the participant from whose client the utterance was received as a basis for determining in what natural language the transcription is to be performed. In step 307, the facility transmits the transcribed text produced by step 306 to participants whose silent mode settings are on so that these clients can display the text on their displays. After step 307, the facility continues in step 302.

Turning to FIG. 3B, after proceeding through connector A, where the call event is to receive text from a participant whose silent mode setting is on, the facility continues from step 302 in step 308. In step 308, the facility transmits the received text to any participants in the call whose silent mode settings are on. In step 309, if at least one participant in the call has their silent mode setting off, then the facility continues in step 310, else the facility continues through connector B to step 302. In step 310, the facility renders the received text as audible speech. In various embodiments, the facility uses a wide variety of text-to-speech techniques are available for performing step 310, including the techniques described in the Wikipedia article for Speech Synthesis, available at http://en.wikipedia.org/wiki/Text_to_speech, which is hereby Incorporated by reference in its entirety. In some embodiments, the facility uses the language identified in column 513 of participant table 500 for the participant whose text was received as a basis for determining in what natural language to render speech. In step 311, the facility transmits the speech rendered in step 310 to any participants in the call whose silent mode settings are off so that their client can play the rendered speech on its speakers. After step 311, the facility continues via connector B in step 302.

If the call event is that the call is ended, the facility continues from step 302 in step 312. In step 312, the facility removes the call from the call table. For example, if the first call corresponding to rows 401-403 of call table 400 ended, the facility would remove these three rows from the call table. After step 312, these steps conclude.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 6A:
FIGS. 6A-6B are display diagrams showing the visual user interface presented on client devices by the facility in some embodiments.
Figure 6B:
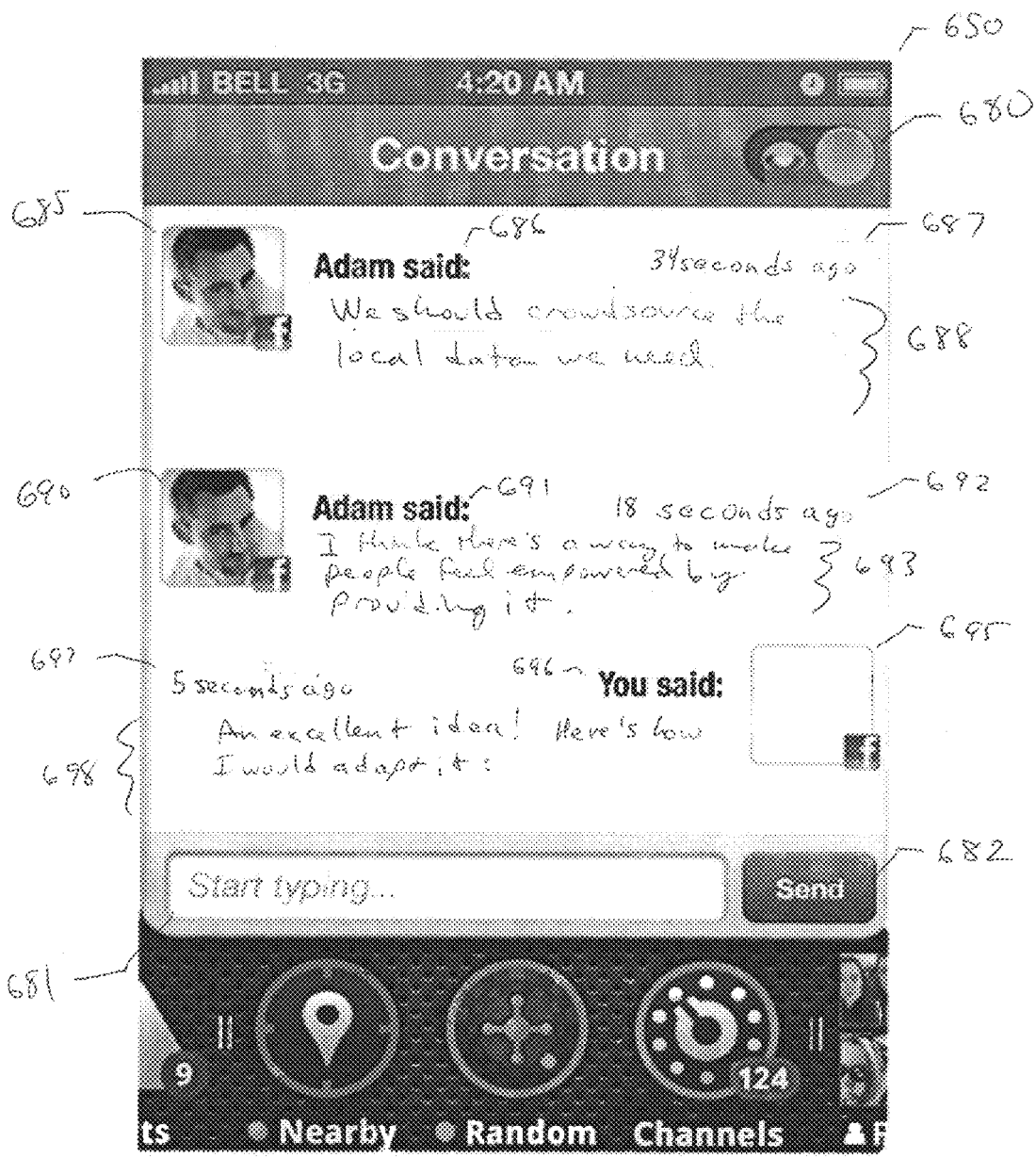

FIGS. 6A-6B are display diagrams showing the visual user interface presented on client devices by the facility in some embodiments. FIG. 6A shows the display in a state where the silent mode is off. The display 600 includes an indication 610 of the amount of time elapsed in the current call. It has a talk button 620 that the user may select, such as by pressing it, to speak within the call. After doing so, the client captures the user's spoken utterances and conveys them to the other participants in the call. If the user wishes to turn on silent mode, the user activates silent mode control 630, such as sliding its slider to the right.

FIG. 6B shows the client display in a state in which the silent mode is on. The display 650 shows that the silent mode control 680 has been activated, by moving it to the right. As a result, the display includes a textual transcript 685-698 of the interactions that have occurred in the call. In this case, another participant, Adam, audibly spoke remarks 688 and 693, which were transcribed by the facility so that they could be read rather than heard by the user to whom the display is being presented. These transcribed remarks are accompanied by a picture (e.g., 685) of the participant who made them; the participant's name (e.g., 686), and the amount of time that has elapsed since the remark was made (e.g., 687). The transcript also includes a remark 698 that was entered textually by the user to whom the display is presented, such as by having typed the remark in text entry field 681 and activating a send control 682. Those skilled in the art will appreciate that a variety of other textual input techniques may be used, such as swiping, natural handwriting, encoded handwriting, etc. user may also activate silent mode control 680 again in order to end silent mode and return to display 600 shown in FIG. 6A.

Figure 7:
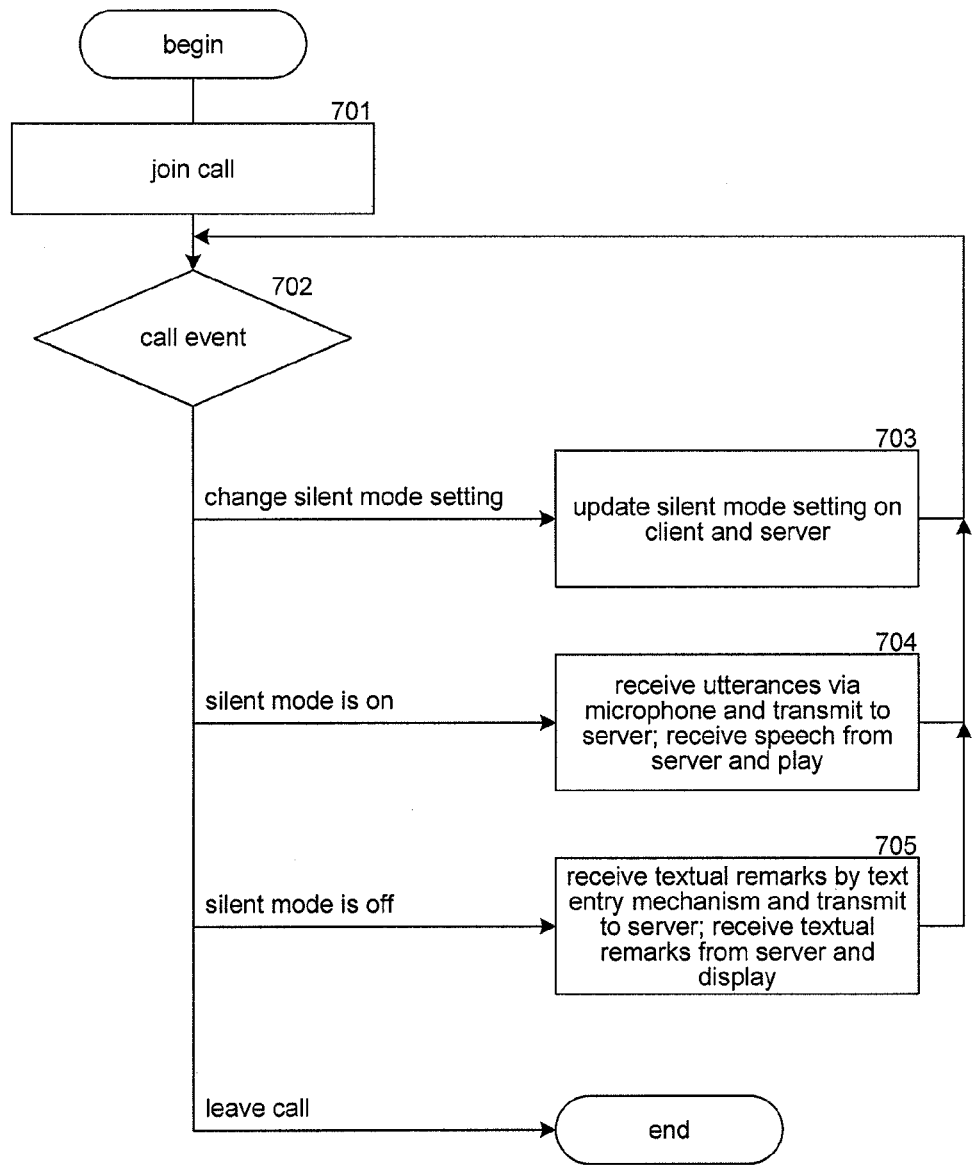
FIG. 7 is a flow diagram showing steps typically performed by the facility on the client to conduct a call in some embodiments.

FIG. 7 is a flow diagram showing steps typically performed by the facility on the client to conduct a call in some embodiments. In step 701, the client joins the call on behalf of the participant using the client. In step 702, the facility switches on the type of a call event. If the call event is to change the participant's silent mode setting, such as by activating control 630/680 in FIGS. 6A-B, then the facility continues from step 702 in step 703. In step 703, the facility updates the silent mode setting on both the client and the server. Updating the silent mode setting on the client involves switching to the one of displays 600 or 650 that corresponds to the new silent mode setting. Updating the silent mode setting on the server involves sending a message to the server notifying the server of the change. After step 703, the facility continues in step 702 to handle the next call event.

If the call event is participation in the call with silent mode on, then the facility continues from step 702 in step 704. In step 704, the facility receives spoken utterances via the client's microphone and transmits these to the server. It also receives speech from the server and plays it via the client's speakers. After step 704, the facility continues in step 702.

If the call event is participation in the all with silent mode off, then the facility continues from step 702 in step 705. In step 705, the facility receives textual remarks from the participant by a text entry mechanism that is available in the client and transmits these textual remarks to the server. It also receives textual remarks from the server and presents them on the client's display. After step 705, the facility continues in step 702.

If the call event is to leave the call, then these steps conclude.

In some embodiments, the facility performs natural language translation on behalf of the call participants. In any case where natural language translation is performed, the facility first transcribes the remark if it was an utterance. After obtaining a textual version of the remark, the facility submits this textual version to automatic natural language translation. For a participant operating in silent mode, the textual result of the natural language translation can be presented directly. For participants not operating in silent mode, the textual results of the natural language translation are subjected to voice-to-speech to produce speech that can be audibly played to the participant. In some such embodiments, the facility uses the language indication in column 513 of participant table 500 to determine the source and destination languages for the translation.

In various embodiments, the facility operates in manners that deviate from the above description in various ways. In some embodiments, the facility performs voice transcription and text-to-speech processing on various other computing devices, including dedicated language servers or the clients. In some embodiments, one or both of the textual and audible versions of remarks are sent to all clients, irrespective of their reported silent mode status.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for supporting a real-time conversation, the method comprising:
   accessing information identifying a plurality of participants in the conversation;
   accessing an indication that a first one of the plurality of participants is participating in the conversation via text, and that second and third ones of the plurality of participants are participating in the conversation via voice;
   receiving a first textual remark from the first participant;
   translating the first textual remark into first speech;

transmitting the first speech to the second and third participants;
receiving a second spoken remark from the second participant;
transmitting the second spoken remark to the third participant;
translating the second spoken remark into a second textual remark; and
transmitting the second textual remark to the first participant.

2. The method of claim 1, further comprising:
subsequent to translating the first textual remark and translating the second spoken remark, receiving an indication that the first participant has transitioned from participating in the conversation via text to participating in the conversation via voice;
subsequent to receiving indication:
receiving a third spoken remark from the second participant; and
transmitting the third spoken remark to the first and third participants without translation.

3. The method of claim 1 wherein the second spoken remark is collected by a push-to-talk application.

4. The method of claim 3 wherein the push-to-talk application executes on a mobile computing device.

5. The method of claim 4 wherein the mobile computing device is a smartphone.

6. The method of claim 3 wherein the push-to-talk application executes on a desktop computing device.

7. The method of claim 1 wherein the second spoken remark is received via a data network.

8. The method of claim 1 wherein the second spoken remark is received via a voice network.

9. The method of claim 1, further comprising:
prior to translating the first textual remark into first speech, translating the first textual remark from a first natural language into a second natural language; and
prior to transmitting the second textual remark to the first participant, translating the second textual remark from the second natural language into the first natural language.

10. One or more instances the computer-readable media collectively having contents adapted to cause a computing system to perform a method for conducting a real-time voice conversation between a first participant and a second participant, the method comprising:
receiving from the first participant a first spoken remark in a first natural language;
subjecting the first spoken remark to speech recognition for first natural language to obtain a first textual remark in the first natural language;
translating the first textual remark in the first natural language into a second natural language;
subjecting the first textual remark in the second natural language to speech synthesis for the second natural language to obtain a first spoken remark in the second natural language;
transmitting the first spoken remark in the second natural language to the second participant;
receiving from the second participant a second spoken remark in a second natural language;
subjecting the second spoken remark to speech recognition for second natural language to obtain a second textual remark in the second natural language;
translating the second textual remark in the second natural language into a first natural language;
subjecting the second textual remark in the first natural language to speech synthesis for the first natural language to obtain a second spoken remark in the first natural language; and
transmitting the second spoken remark in the first natural language to the first participant.

11. One or more instances the computer-readable media collectively storing a call table data structure representing state for a distinguished call, the data structure comprising a plurality of entries, each entry comprising:
information identifying a user participating in the distinguished call; and
information indicating whether the identified user is participating in the distinguished call by voice or by text,
such that the information of the data structure can be used to identify transcription and speech rendering needed to conduct the call.

12. The instances of computer readable media of claim 11 wherein each entry further comprises information identifying a natural language used by the identified user.

13. A method for facilitating participation in a real-time natural language discussion by a distinguished participant, the method performed in a computing system having a display, comprising:
presenting on the display a first visual indication indicating that the computing system is participating in the discussion in an audio mode, in which remarks by participants other than the distinguished participant are rendered audibly and remarks by the distinguished participant are received audibly;
presenting on the display, simultaneously with the indication, a mode control; and
in response to receiving input activating the mode control, presenting on the display in place of the first visual indication a second visual indication indicating that the computing system is participating in the discussion in a silent mode, in which remarks by participants other than the distinguished participant are presented textually on the display and remarks by a distinguished participant are entered textually into the computing system.

14. The method of claim 13, further comprising, in response to receiving the input activating the mode control, textually presenting on the display a remark made by another participant.

15. The method of claim 13, further comprising, in response to receiving the input activating the mode control, presenting on the display a text entry control for textually entering a remark made by the distinguished participant.

* * * * *